United States Patent
Fedeli et al.

(10) Patent No.: US 6,212,034 B1
(45) Date of Patent: Apr. 3, 2001

(54) MAGNETIC HEAD HAVING HORIZONTAL POLE PIECES

(75) Inventors: Jean-Marc Fedeli, St Martin d'Heres; Robert Cuchet, Grenoble; Céline Germain, Seyssinet-Pariset, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 795 days.

(21) Appl. No.: 08/517,604

(22) Filed: Aug. 22, 1995

(30) Foreign Application Priority Data

Sep. 13, 1994 (FR) .................................................. 94 10896

(51) Int. Cl.$^7$ .................................................. G11B 5/147
(52) U.S. Cl. .................................................. 360/126
(58) Field of Search .................................. 360/119, 120, 360/122, 125, 126, 127

(56) References Cited

U.S. PATENT DOCUMENTS

| | | | |
|---|---|---|---|
| 2,908,770 | 10/1959 | Warren | 360/122 |
| 4,837,924 | * 6/1989 | Lazzari | 360/125 |
| 4,949,207 | * 8/1990 | Lazzari | 360/119 |
| 4,984,118 | 1/1991 | Springer | 360/125 |
| 4,992,897 | * 2/1991 | Deroux-Dauphin | 360/103 |
| 5,195,006 | * 3/1993 | Morikawa | 360/126 |
| 5,224,260 | * 7/1993 | Fedeli et al. | 360/127 X |
| 5,274,520 | * 12/1993 | Matsuzono et al. | 360/113 |
| 5,274,521 | * 12/1993 | Miyauchi et al. | 360/119 |

FOREIGN PATENT DOCUMENTS

| | | |
|---|---|---|
| 0 472 187 | 2/1992 | (EP) . |
| 2 676 301 | 11/1992 | (FR) . |
| 2 687 497 | 8/1993 | (FR) . |

OTHER PUBLICATIONS

Patent Abstracts of Japan, vol. 7, No. 121, May 25, 1983, and JP-A-58 037830, Mar. 5, 1983.
IBM Technical Disclosure Bulletin, vol. 31, No. 3, pp. 291–292, Aug. 31, 1988, "Film Head Structure Optimized for Writing".
Patent Abstracts of Japan, vol. 18, No. 429, Aug. 10, 1994, JP-A-6 131635, May 13, 1994.

* cited by examiner

Primary Examiner—William Klimowicz
(74) Attorney, Agent, or Firm—Oblon, Spivak, McClelland, Maier & Neustadt, P.C.

(57) ABSTRACT

A magnetic head for recording having horizontal pole pieces. The magnetic head includes a lower subassembly mounted on a substrate including a lower magnetic layer, two magnetic pillars and a conductor winding. An insulating ridge having inclined sides and a flat apex is mounted on the lower subassembly. Two flux concentrators are mounted on the sloping sides of the insulating ridge and end in a face which is flush with the apex of the ridge. The pole pieces are formed as straight bars and mounted on top of the inner ends of the flux concentrators.

1 Claim, 4 Drawing Sheets

MAGNETIC HEAD HAVING HORIZONTAL POLE PIECES

BACKGROUND OF THE INVENTION

1. Field of the Invention

The present invention relates to a magnetic head having horizontal pole pieces. It is used in magnetic recording.

2. Discussion of the Background

A known magnetic head is shown in section in FIG. 1 and in plan view in FIG. 2. On a substrate 8, said head has a first subassembly 10 constituted by a lower magnetic layer 12, two magnetic pillars $14_1$, $14_2$ resting on said magnetic layer 12 and a conductor winding 18 surrounding the pillars $14_1$, $14_2$. On said subassembly 10 there is a central, insulating pin or ridge 19 having two inclined sides and a flat apex. On the subassembly 10 and overlapping the central, insulating ridge 19 there is a second subassembly 20 formed from two portions, namely a first portion constituted by two magnetic flux concentrators $22_1$, $22_2$ with an outer, wide end bearing on the pillars $14_1$, $14_2$ and an inner, narrower end, as well as a second portion constituted by two pole pieces $24_1$, $24_2$ separated by a head gap 26 and in contact with the concentrators $22_1$, $22_2$. These pole pieces have an elongated S shape with an oblique median portion covering the inclined sides of the pin 19.

FIG. 3 shows in detailed manner the right-hand half of the second subassembly 20. This drawing makes it possible to define a few dimensions and a few particular zones. The pole pieces have a thickness Ee at the head gap 26 and Ep remote from the head gap. The ridge or pin 19 has a half-length Lp. The concentrators $22_2$ have a thickness Ec. The movement plane of the head is at a distance H from the upper surface of the concentrators. The angle formed with the horizontal by the pole piece in its inclined portion is designated θ. Moreover, the point G designates the centre of the head gap, the point A marks the limit of the straight zone of a pole and point P corresponds to the zone where the pole piece leaves the movement plane and becomes inclined.

Although these heads are satisfactory in certain respects, they still suffer from disadvantages when the width of the recording track becomes small and the operating frequency high. These different disadvantages can be analyzed in the following way.

The construction of the pole pieces imposes a monolithic structure for the same. With a considerable thickness of the pole pieces, eddy currents appear and create heating, as well as a reduction of efficiency. By reducing the thicknesses Ep and Ec, this effect is reduced, but to the detriment of the overall efficiency, as well as the maximum field obtained in the head gap under saturation conditions. Thus, there is a maximum and minimum limitation for the thickness Ep.

As shown in FIG. 4, the reading signal, apart from the main peak Pp, has two small secondary peaks Ps1, Ps2 at a distance of approximately L corresponding to point P in FIG. 3, where the poles are no longer in the movement plane. The height of these parasitic peaks is also dependent on the angle θ obtained during the production of the ridge or pin.

In order to obtain a maximum field in the head gap on writing, it is necessary to move the point A (saturation appearance point) towards the head gap. It is then necessary to reduce the half-length Lp of the ridge without modifying the optimum angle θ, which must remain small in order to ensure the quality of the magnetic deposit. This reduction is difficult for lengths below 5 μm. Moreover, the production of the head gap on a ridge of limited length also becomes very difficult.

Thus, the track width reduction and the obtaining of a larger field in the head gap require the reduction of the size of the relief and the retention of a small angle θ. This leads to technological problems in producing the ridge and the head gap for small track widths.

In order to avoid parasitic rereading of adjacent tracks, the poles must have a width equal to that of the track to be read and the introduction of a concentrator with a wide section towards the pillars and a narrow section towards the head gap makes it possible to retain a good efficiency. However, a relatively large height H is necessary to avoid any rereading in the presence of the wide section of the concentrator. Moreover, at high frequency, the considerable thickness Ep+Ec of the pole pieces and the concentrator is prejudicial with respect to eddy currents and it is necessary to reduce each thickness and magnetically decouple the layers.

SUMMARY OF THE INVENTION

The object of the present invention is to obviate these disadvantages.

The invention modifies the structure of the second subassembly 20 in FIGS. 1 to 3 in such a way that the two pole pieces are horizontal and no longer have an elongated S shape with an oblique median portion. In other words, the pole pieces are in the form of straight bars. Conversely, it is the concentrators which have an inclined portion, which bears on one of the inclined sides of the ridge or pin. These arrangements allow:

- the reduction of the half-length Lp of the ridge and the moving closer of the head gap point A and thus it is possible to obtain a maximum field in the head gap,
- the production of a head gap on a planar surface,
- the transfer of the point P to the origin of the parasitic peaks remote from the main magnetic circuit,
- a better control of the pole pieces which are produced flat, particularly with regards to the composition and orientation of the domains or fields,
- the reduction of the thickness Ep of the poles (which reduces eddy currents and facilitates the orientation of the domains or fields) without reducing the overall efficiency of the head.

More specifically, the present invention relates to a magnetic head of the type described relative to FIGS. 1 and 3 and which is characterized in that, in the second subassembly located on the upper portion of the head:

- the two concentrators have their inner end bearing on the two inclined sides of the central, insulating ridge, said ends being flush with the apex of the ridge,
- the two pole pieces are constituted by two straight bars bearing on the flat apex of the ridge and on the inner ends of the two concentrators, said bars being extended beyond said ends and overhang said concentrators.

DESCRIPTION OF EMBODIMENTS

Figure 1:
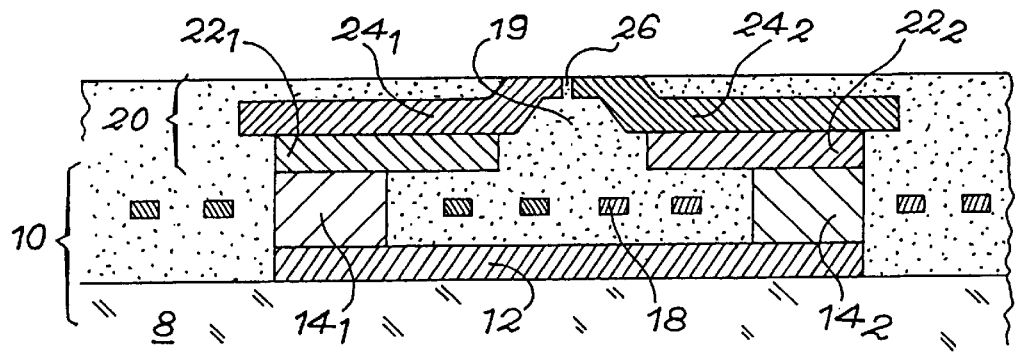
FIG. 1, already described, shows in section a prior art magnetic head.
Figure 2:
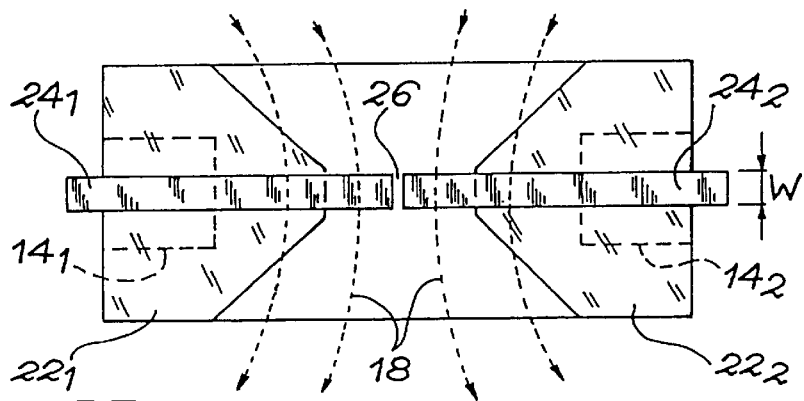
FIG. 2, already described, shows the same head in plan view.
Figure 5:
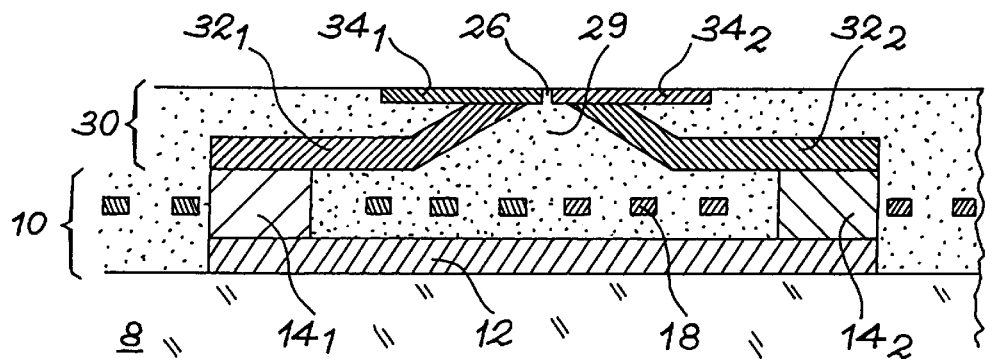
FIG. 5 shows in section a magnetic head according to the invention.
Figure 6:
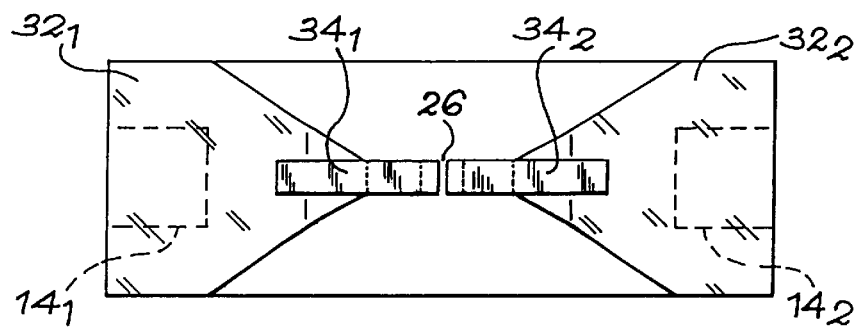
FIG. 6 is a plan view of the same head.

FIG. 5 shows in section and FIG. 6 in plan view an embodiment of a magnetic head according to the invention. For simplification purposes, the elements already shown in FIGS. 1 and 2 carry the same references, namely substrate 8, first subassembly 10 with its magnetic layer 12, its two pillars $14_1$ and $14_2$ and its winding 18.

The second subassembly 30 covers the ridge or pin 29 and has two concentrators $32_1$, $32_2$ and two pole pieces $34_1$, $34_2$ separated by a head gap 26. The inner portion of the concentrators covers the inclined sides of the ridge or pin 29, so that said concentrators have a broken form. However, the pole pieces are straight or horizontal.

Figure 3:
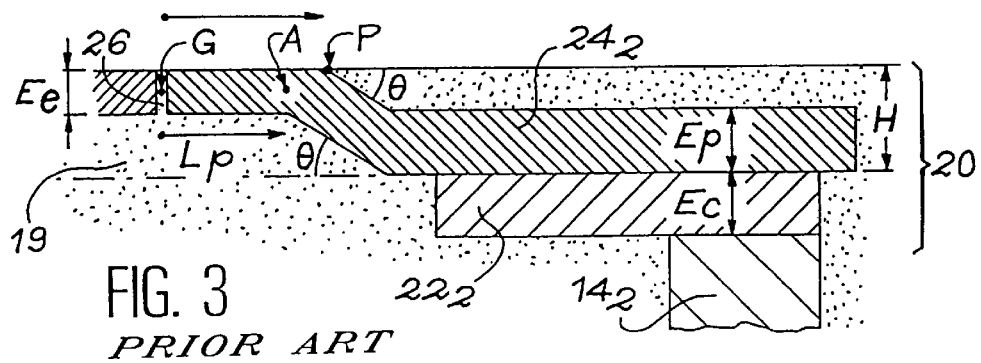
FIG. 3, already described, illustrates a detail of the upper magnetic pole piece in a prior art head.
Figure 4:
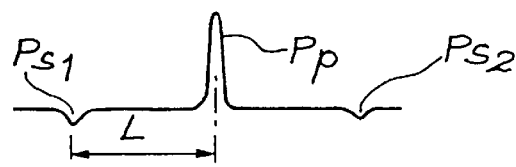
FIG. 4, already described, shows the shape of the measuring signal obtained with the prior art heads.
Figure 7:
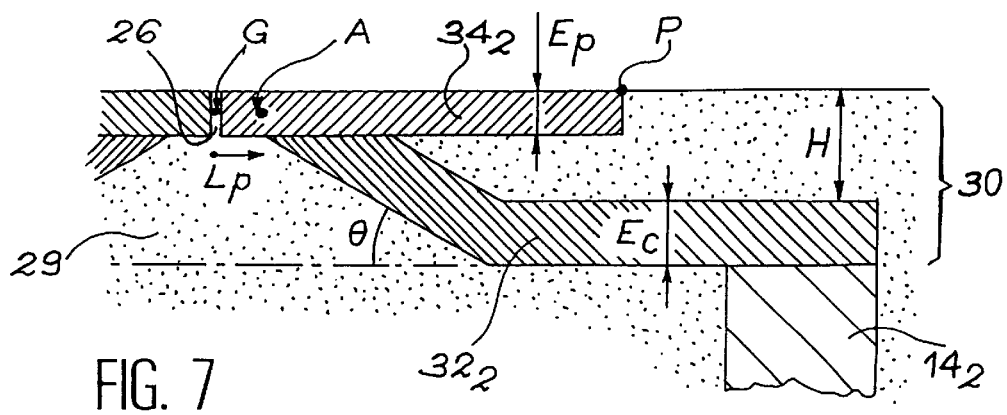
FIG. 7 shows a detail of the upper magnetic piece of a head according to the invention.

FIG. 7 shows in greater detail the right-hand half-portion of the second subassembly 30, which is to be compared with the already described FIG. 3. The distance H has been retained, so that the wide portion is moved away from the concentrators of the movement plane. Point P has been considerably moved back, whilst the thickness Ep and half-length Lp have been reduced.

FIGS. 8A to 8H represent eight stages of a process for producing a head according to the invention.

Figure 8A:
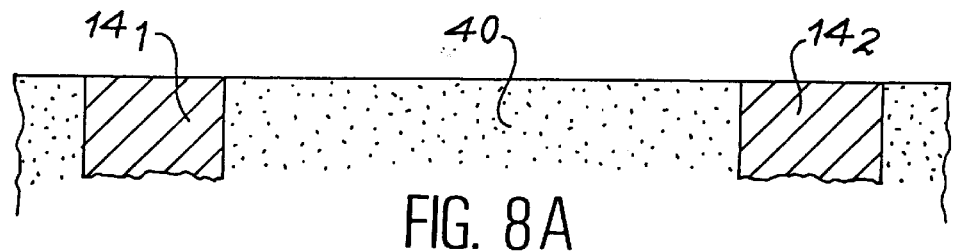
FIGS. 8A, 8B, 8C, 8D, 8E, 8F, 8G, 8H illustrate eight stages of a process for producing an upper portion of a head according to the invention.

The first stage is to produce a first subassembly having, in its upper portion, two magnetic pillars $14_1$, $14_2$ surrounded by an insulator 40 (silica, alumina—FIG. 8A). The operations making it possible to produce such a subassembly are known and described e.g. in FR-A-2 644 292 and EP-A-262 028.

Figure 8B:
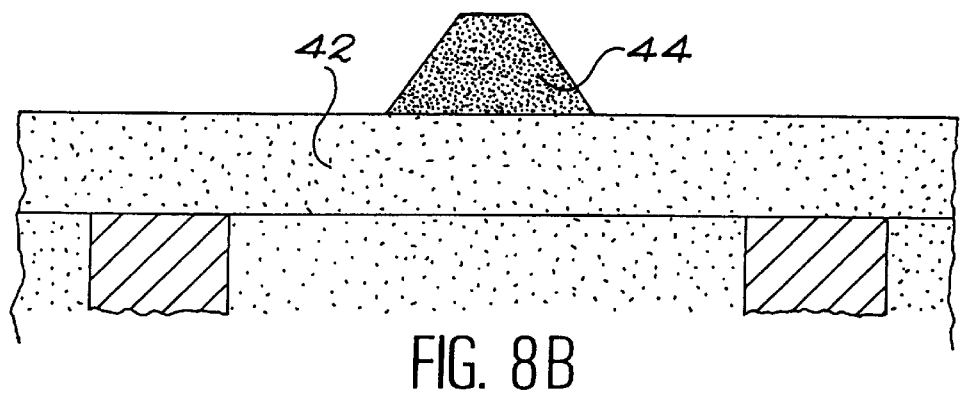
Figure 8C:
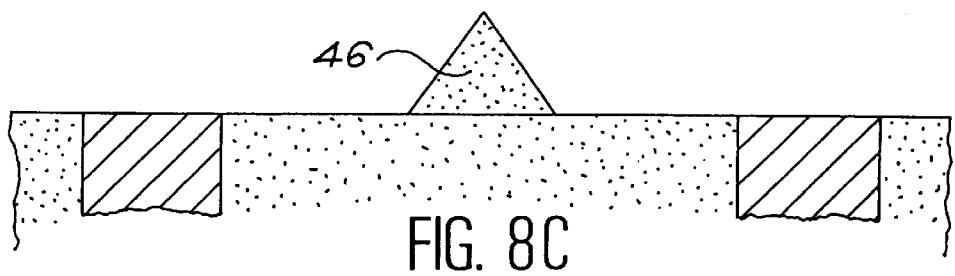

This is followed by the deposition of an insulating layer 42, e.g. of silica, and a resin mask 44 (FIG. 8B). The insulating layer 42 is etched, e.g. by reactive ionic etching (RIE), which also etches the resin and leaves behind a ridge having a triangular section 46 (FIG. 8C).

Figure 8D:
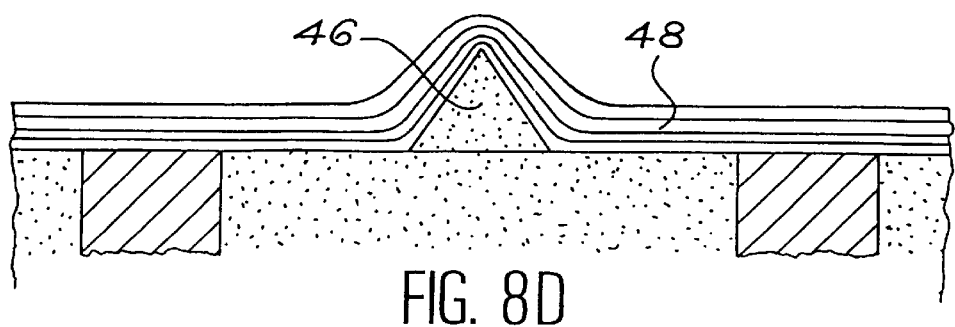
Figure 8E:
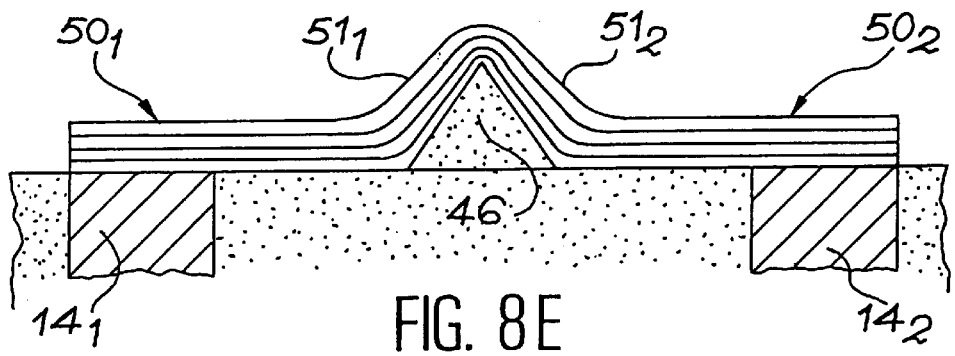

This is followed by the deposition of a magnetic layer 48 on the assembly (FIG. 8D). It can be a laminated layer with an alternation of magnetic layers (e.g. FeNi) and insulating layers (e.g. $Si_3N_4$ or $SiO_2$).

This is followed by photolithography and etching by ionic machining to limit the magnetic layer perpendicular with respect to the pillars $14_1$ $14_2$ (FIG. 8E) and give it its shape with the wide portions $50_1$, $50_2$ (cf. FIG. 6) and the thinned portions $51_1$, $51_2$, which bear on the inclined sides of the ridge 46. The shape of the concentrators has been illustrated in plan view in FIG. 6.

Figure 8F:
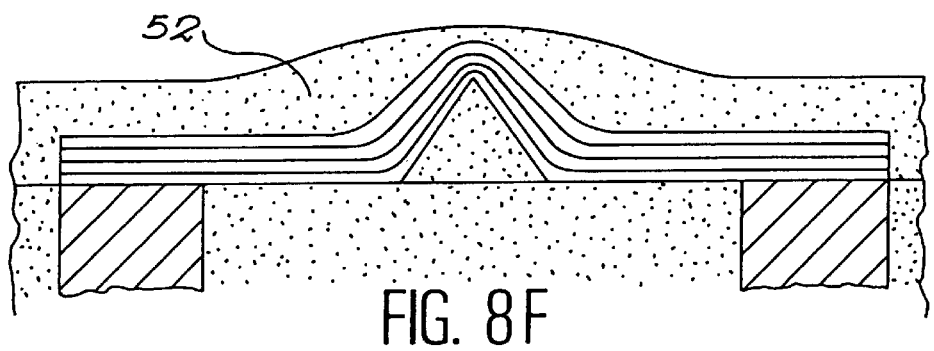
Figure 8G:
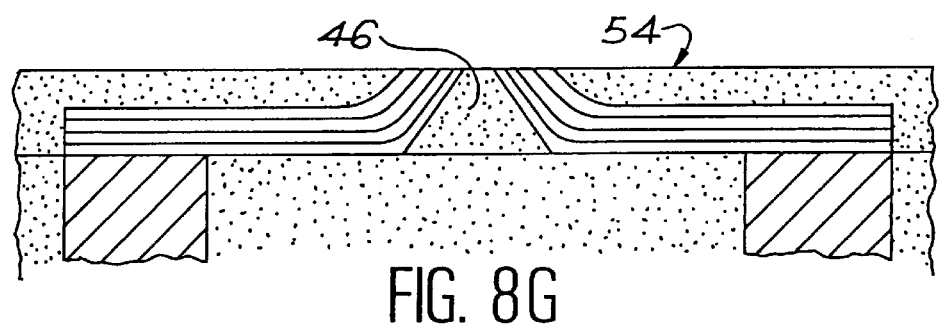
Figure 8H:
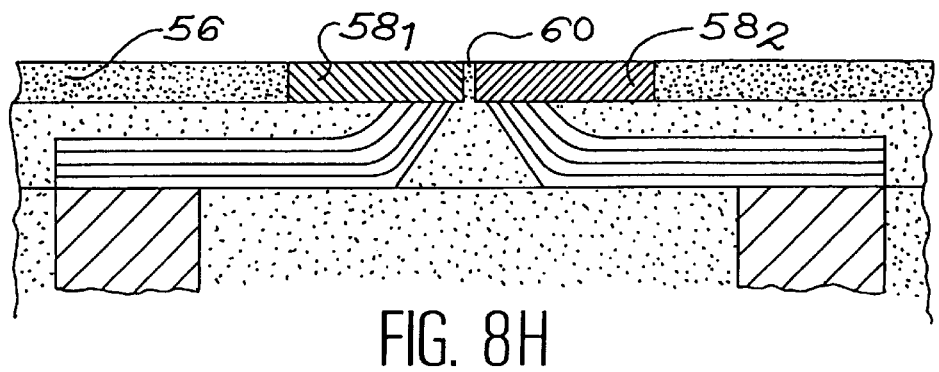

This is followed by the deposition on the assembly of a thick insulator 52 (FIG. 8F). The assembly obtained is made level in order to form a plane 54 (FIG. 8G). This operation brings about the appearance of the flat apex of the ridge 46.

The head is finished by the deposition of an insulating layer 56 (FIG. 8H) and the formation, in a recess made in said layer, of two pole pieces $58_1$, $58_2$ shaped like a straight bar and separated by a head gap 60.

What is claimed is:

1. Magnetic head comprising:

a substrate;

a first subassembly comprising a lower magnetic layer resting on said substrate, two magnetic pillars resting on the magnetic layer, and a conductor winding surrounding said two magnetic pillars;

a central, insulating ridge, mounted on said first subassembly, having two sides inclined with respect to said substrate and a flat apex parallel to said substrate;

two magnetic flux concentrators having narrow inner ends bearing on said two inclined sides of the central, insulating ridge, said inner ends having a face parallel to said substrate and flush with the apex of the ridge, said magnetic flux concentrators having further wide outer ends bearing on said pillars; and two pole pieces constituted by two straight bars having lower and upper faces parallel to said substrate, said lower face bearing on the flat apex of said ridge and on the face of said inner ends of said two concentrators, said pole pieces extending beyond said face of said inner ends of said two concentrators and overhanging said concentrators.

* * * * *